(12) United States Patent
Chen et al.

(10) Patent No.: US 11,057,114 B2
(45) Date of Patent: Jul. 6, 2021

(54) OPTICAL LOOPBACK CIRCUITS FOR TRANSCEIVERS AND RELATED METHODS

(71) Applicant: Acacia Communications, Inc., Maynard, MA (US)

(72) Inventors: Long Chen, Marlboro, NJ (US); Christopher Doerr, Middleton, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 15/228,462

(22) Filed: Aug. 4, 2016

(65) Prior Publication Data

US 2018/0041282 A1 Feb. 8, 2018

(51) Int. Cl.
*H04B 10/075* (2013.01)
*H04B 10/50* (2013.01)
*H04B 10/40* (2013.01)
*H04B 10/035* (2013.01)

(52) U.S. Cl.
CPC ......... *H04B 10/501* (2013.01); *H04B 10/035* (2013.01); *H04B 10/075* (2013.01); *H04B 10/40* (2013.01); *H04B 10/50* (2013.01); *H04B 10/5057* (2013.01)

(58) Field of Classification Search
None
See application file for complete search history.

(56) References Cited

U.S. PATENT DOCUMENTS

| | | | | |
|---|---|---|---|---|
| 5,444,802 A | * | 8/1995 | Shibata | G02F 1/3521 385/16 |
| 5,723,856 A | * | 3/1998 | Yao | G02F 1/0123 250/205 |
| 6,590,697 B2 | * | 7/2003 | Vaganov | G02B 6/266 359/290 |

(Continued)

FOREIGN PATENT DOCUMENTS

| | | | |
|---|---|---|---|
| EP | 0674210 A2 * | 9/1995 | G02F 1/0327 |
| EP | 1 380 828 A1 | 1/2004 | |
| WO | WO 2016/007867 A2 | 1/2016 | |

OTHER PUBLICATIONS

Lee et al., Free-Space Fiber-Optic Switches Based on MEMS Vertical Torsion Mirrrors, 1999, IEEE, pp. 7-13.*

(Continued)

*Primary Examiner* — Jai M Lee
(74) *Attorney, Agent, or Firm* — Joseph D'Angelo (57) ABSTRACT

Optical transceivers comprising optical loopback circuits are described. The optical transceiver may comprise a housing, which may host a transmitter, a receiver and the optical loopback circuit. The optical loopback circuit may be configured to route at least a portion of a modulated optical signal from the transmitter to the receiver. The optical loopback circuit may comprise tap couplers and/or optical switches. The optical transceiver may be switched between a normal mode and a calibration mode. The optical transceiver may maintain the same fiber connections even when the optical transceiver is switched from one mode to another. The transmitter, the receiver and the optical loopback circuit may be disposed on a common substrate, or on separate substrates.

15 Claims, 8 Drawing Sheets

(56) References Cited

U.S. PATENT DOCUMENTS

| | | | | |
|---|---|---|---|---|
| 7,111,208 B2* | 9/2006 | Hoang | ............. | H04L 1/243 |
| | | | | 370/249 |
| 7,272,271 B2* | 9/2007 | Kaplan | ............. | G02F 1/225 |
| | | | | 359/246 |
| 7,881,616 B2* | 2/2011 | Hahin | ............. | H04B 10/66 |
| | | | | 398/137 |
| 8,184,355 B2* | 5/2012 | Tsunoda | ............. | G02F 1/0123 |
| | | | | 359/279 |
| 9,178,610 B1* | 11/2015 | Chan | ............. | H04B 10/2589 |
| 9,195,079 B2 | 11/2015 | Doerr et al. | | |
| 9,494,748 B2 | 11/2016 | Chen et al. | | |
| 9,693,122 B2* | 6/2017 | Garcia | ............. | H04Q 11/0005 |
| 9,749,060 B1* | 8/2017 | Wang | ............. | H04B 10/614 |
| 10,078,232 B1* | 9/2018 | Vermeulen | ............. | G02F 1/011 |
| 10,211,917 B1* | 2/2019 | Wang | ............. | H04B 10/541 |
| 10,637,584 B1* | 4/2020 | Palmer | ............. | H04Q 11/0005 |
| 2003/0147591 A1* | 8/2003 | Doi | ............. | G02F 1/0123 |
| | | | | 385/39 |
| 2004/0071389 A1* | 4/2004 | Hofmeister | ............. | H04B 10/40 |
| | | | | 385/16 |
| 2005/0025419 A1* | 2/2005 | Fish | ............. | G02B 6/12004 |
| | | | | 385/31 |
| 2005/0069331 A1* | 3/2005 | Lee | ............. | H04B 10/505 |
| | | | | 398/188 |
| 2005/0271394 A1* | 12/2005 | Whiteaway | ............. | H04B 10/25133 |
| | | | | 398/188 |
| 2007/0146860 A1* | 6/2007 | Kikuchi | ............. | G02F 1/0123 |
| | | | | 359/239 |
| 2008/0089693 A1* | 4/2008 | El-Ahmadi | ............. | H04L 1/0057 |
| | | | | 398/135 |
| 2008/0094123 A1* | 4/2008 | Koh | ............. | G02F 1/0123 |
| | | | | 327/513 |
| 2009/0282917 A1* | 11/2009 | Acar | ............. | G01P 1/023 |
| | | | | 73/514.02 |
| 2010/0303469 A1* | 12/2010 | Barton | ............. | H04B 10/801 |
| | | | | 398/184 |
| 2011/0200324 A1* | 8/2011 | Boertjes | ............. | H04J 14/0212 |
| | | | | 398/16 |
| 2012/0051738 A1* | 3/2012 | Skirmont | ............. | H04B 10/0773 |
| | | | | 398/25 |
| 2012/0170931 A1* | 7/2012 | Evans | ............. | H04J 14/0227 |
| | | | | 398/48 |
| 2013/0308898 A1 | 11/2013 | Doerr et al. | | |
| 2014/0036937 A1 | 2/2014 | Doerr | | |
| 2014/0043050 A1* | 2/2014 | Stone | ............. | G01R 31/3187 |
| | | | | 324/750.01 |
| 2015/0222968 A1* | 8/2015 | Garcia | ............. | H04B 10/40 |
| | | | | 398/48 |
| 2015/0381273 A1* | 12/2015 | Gloeckner | ............. | H04L 1/243 |
| | | | | 398/16 |
| 2016/0013866 A1 | 1/2016 | Doerr | | |
| 2016/0357085 A1* | 12/2016 | Jewart | ............. | G02F 1/2257 |
| 2017/0134094 A1* | 5/2017 | Saathoff | ............. | H04B 10/40 |
| 2017/0142503 A1* | 5/2017 | Takei | ............. | H04B 10/40 |

OTHER PUBLICATIONS

Michel, Stephanie, Lightwave: Which optical modulation scheme best fits my application?, 2013, Pennwell Corporation, pp. 1-9.*

Benjamin et al., 336-Channel Electro-Optical Interconnect: Underfill Process Improvement, Fiber Bundle and Reliability Results, 2014, IEEE (Year: 2014).*

NASA Tech Briefs, Piezoelectric Diffraction-Based Optical Switches, Nov. 2003 (Year: 2003).*

International Search Report and Written Opinion dated Aug. 30, 2017 in connection with International Application No. PCT/US2017/038519.

International Preliminary Report on Patentability dated Feb. 14, 2019 in connection with International Application No. PCT/US2017/038519

* cited by examiner

OPTICAL LOOPBACK CIRCUITS FOR TRANSCEIVERS AND RELATED METHODS

BACKGROUND

Field

The present application relates to optical transceivers.

Related Art

Optical transceivers include an optical transmitter and an optical receiver. Some such optical transceivers are connected to optical communication channels having lengths of several tens, hundreds, or even thousands of kilometers. Some optical transceivers are configured to transmit optical data in the form of symbols, where each symbol represents more than one bit.

BRIEF SUMMARY

According to one aspect of the present application, an apparatus is provided. The apparatus may comprise a housing and an optical transceiver disposed within the housing. The optical transceiver may comprise an optical transmitter having an output terminal, the optical transmitter being configured to transmit a plurality of symbols through the output terminal, wherein at least one symbol of the plurality of symbols represents a number of bits greater than one; an optical receiver having an input terminal; and an optical loopback circuit coupling the output terminal of the optical transmitter to the input terminal of the optical receiver.

According to another aspect of the present application, a method is provided. The method may comprise modulating, with an optical transmitter disposed within a housing, an optical signal with a plurality of symbols, wherein at least one symbol of the plurality of symbols represents a number of bits greater than one; transmitting the optical signal through an output terminal of the optical transmitter; and coupling the optical signal from the output terminal of the optical transmitter to an input terminal of an optical receiver disposed within the housing using an optical loopback circuit disposed within the housing.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Applicant has appreciated that optical transceivers equipped with optical loopback circuitry connecting the optical transmitter to the optical receiver may enable the calibration of transmission signals without having to temporarily manually connect and disconnect fiber jumpers to the transceiver for purposes of performing calibration. Fiber jumpers are fiber optics components, such as fiber patch cords, used during the calibration mode of optical transceivers, and that are disconnected from at least one port of the optical transceiver during the normal mode of operation of the optical transceiver.

Modern optical transceivers sometimes employ multi-level modulation schemes, such as quadrature phase-shift keying (QPSK) or 64-quadrature amplitude modulation (64-QAM), in which symbols representing more than one bit are transmitted. Optical signals modulated with such multi-level schemes may be particularly susceptible to distortion during transit. For instance, polarization-mode dispersion (PMD), chromatic dispersion and/or attenuation of an optical signal can occur as the signal traverses a communication channel, and these forms of distortion can negatively impact accurate operation of the modulation schemes mentioned. The distortion may be exacerbated in optical communication channels exceeding tens of kilometers in length. In addition, certain optical transceivers, when installed in a network, may exhibit transmission parameters that deviate from the designed configuration, particularly if the transceiver is analog in nature. For example, an optical transceiver may exhibit an output power that deviates from the desired optical power.

Therefore, it is often desirable to calibrate the optical transceiver, upon being installed in the network, to ensure that it operates according to the specification. Conventional calibration procedures often utilize fiber jumpers to directly route optical signals between the transmitter and the receiver of an optical transceiver. However, this approach involves manually plugging fiber jumpers into the input and output (I/O) ports of an optical transceiver. Upon completion of the calibration procedure, the fiber jumpers are unplugged from the I/O port, and the optical fibers serving as optical communication channels are plugged in.

According to one aspect of the present application, an optical transceiver may be equipped with optical loopback circuitry arranged to optically couple the transmitter to the receiver in a back-to-back configuration. The optical feedback circuitry may be disposed within the housing hosting the optical transceiver, such as a pluggable optical transceiver module. In this application, an optical transceiver module may alternatively be referred to simply as "optical transceiver" or "optical module". The optical feedback circuitry may comprise one or more optical fibers and/or free space optical paths. In some embodiments, the optical transmitter may be disposed on the same semiconductor substrate on which the transceiver and the receiver are disposed. In such embodiments, the optical loopback circuitry may comprise integrated optical components, such as optical waveguides, tap couplers, switches, or any suitable combination thereof.

In some embodiments, the optical transceiver may be programmed to run a calibration procedure using the optical loopback circuitry. Compared to conventional systems, the calibration procedure may be performed without having to plug/unplug fiber jumpers into or from the optical transceiver.

According to one aspect of the present application, the optical transceiver described herein may be configured to operate in a "normal mode" or in a "calibration mode". In the normal mode, which may be referred to herein alternatively as "operational mode" or "active mode," the optical transceiver may transmit/receive data from one or more other transceivers, or any other suitable optical device within a network. In the calibration mode, the optical transceiver may be configured to loop an optical signal between the transmitter and the receiver of the same transceiver to monitor at least one parameter associated with the transmitter, such as the output power and/or the extinction ratio. In some embodiments, the optical transceiver may be configured to switch between modes according to predefined intervals, for example to perform periodic maintenance.

The aspects and embodiments described above, as well as additional aspects and embodiments, are described further below. These aspects and/or embodiments may be used individually, all together, or in any combination of two or more, as the application is not limited in this respect.

Figure 1:
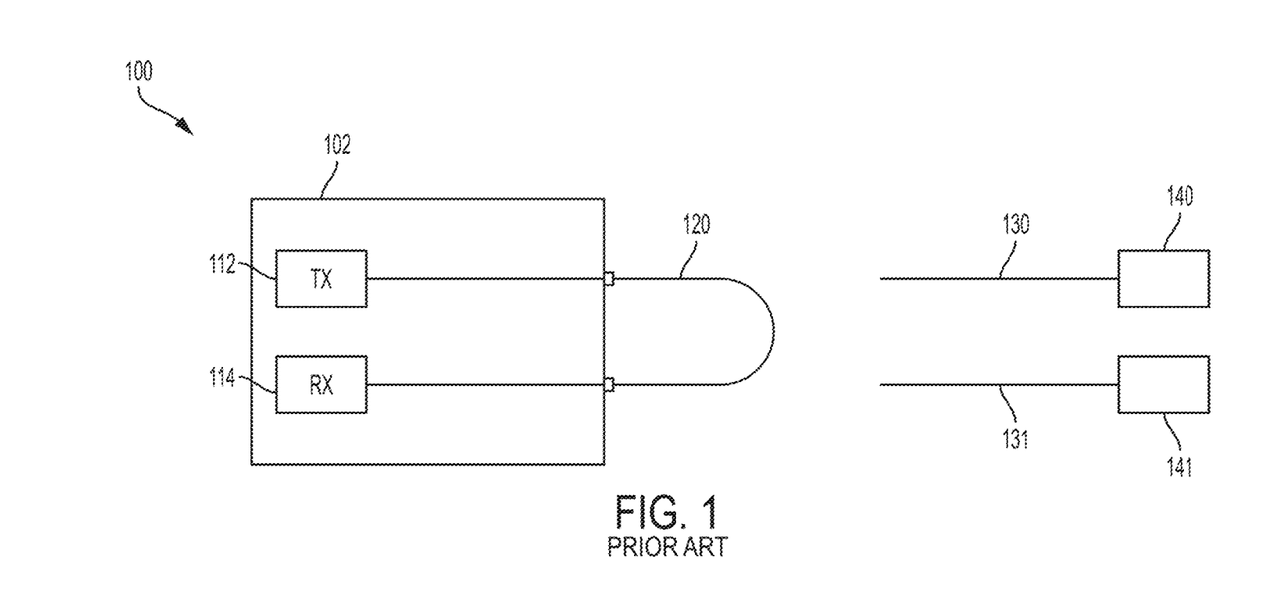
FIG. 1 is a block diagram illustrating a conventional configuration for calibrating an optical transceiver using a fiber jumper.

FIG. 1 is a block diagram illustrating a conventional configuration for calibrating an optical transceiver using a fiber jumper 120. System 100 comprises an optical module 102 and a fiber jumper 120 connected between the transmitter port and the receiver port of the optical module 102. The optical module 102 comprises a transmitter 112 and a receiver 114. This configuration can be used to perform a calibration procedure of optical module 102. Being the transmitted signal looped back to the receiver, one or more parameters of the transmitter can be monitored. If one of such parameters, such as the output power, is outside a desired range, optical module 102 can reconfigure the transmitter 112 to adjust its output power until it is within such range. Once the optical module 102 has been calibrated, fiber jumper 120 may be disconnected and the optical module may be connected to optical fibers 130 and 131, thus connecting the optical module 102 to optical devices 140 and 141 which can include a receiver and transmitter of another optical module.

Calibration of an optical transceiver in the manner described in connection FIG. 1 is impractical in at least some situations as it involves disconnecting the fiber jumper 120 and connecting optical fibers 130 and 131 once the calibration has been completed.

One aspect of the present application provides optical modules that can be calibrated without resorting to fiber jumpers of the type described in connection with FIG. 1. Such optical modules may be equipped with an optical loopback circuit configured to couple at least a portion of an optical signal between a transmitter and a receiver of an optical module (e.g., an optical transceiver). Such an optical loopback circuit may be used to perform a calibration procedure. Once the calibration has been completed and the optical module is ready to transmit and/or receive optical signals to/from other optical modules, the optical loopback circuit may remain in place and the optical module may be switched to operate in a normal mode. One advantage of this approach is that, once installed in a network, an optical module may be switched between the calibration mode and the normal mode, even multiple times, while maintaining the same fiber connections.

Figure 2A:
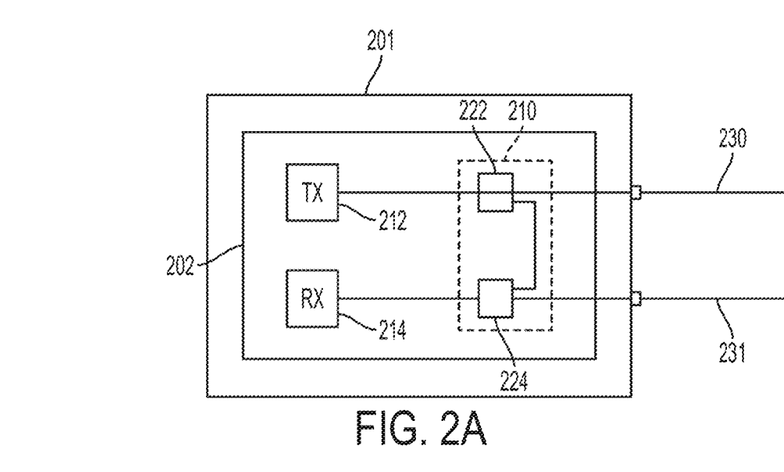
FIGS. 2A-2B are block diagrams illustrating optical feedback circuits comprising optical switches, according to some non-limiting embodiments.
Figure 2B:
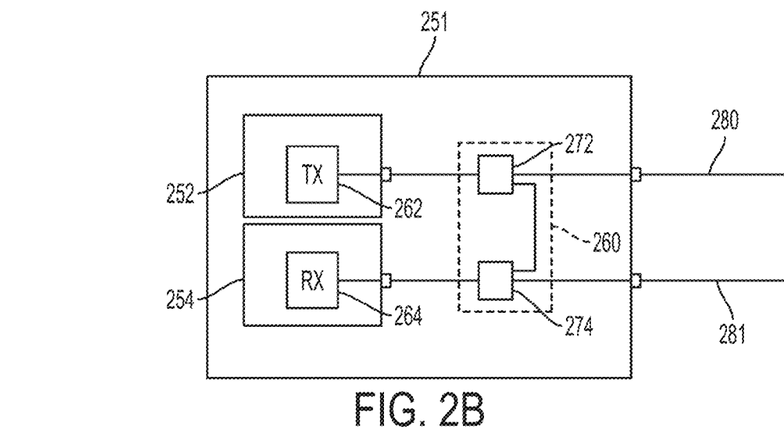

FIGS. 2A-2B are block diagrams illustrating optical feedback circuits comprising optical switches, according to some non-limiting embodiments. FIG. 2A illustrates an optical module 201 in which transmitter 212, receiver 214 and optical loopback circuit 210 are disposed on a common semiconductor substrate 202, such as a silicon substrate. Transmitter 212 may comprise one or more optical modulators, such as Mach-Zehnder modulators. In some embodiments, transmitter 212 may further comprise one or more lasers, configured to provide continuous wave (CW) optical signals to the optical modulators. Transmitter 212 may be configured to transmit, using the optical modulators, optical signals having data rates exceeding 10 Gbps in some embodiments, 20 Gbps in some embodiments, 30 Gbps in some embodiments, 40 Gbps in some embodiments, 50 Gbps in some embodiments, 60 Gbps in some embodiments, between 10 Gbps and 600 Gbps, or any value or range of values within such ranges. In some embodiments, transmitter 212 may be configured to transmit optical signals having advanced modulation schemes, meaning schemes in which at least one of the transmitted symbols represents at least two bits of data. For example, the transmitter 212 may transmit optical signals according to quadrature phase-shift keying (QPSK), 4-quadrature amplitude modulation (4-QAM), 8-QAM, 16-QAM, 32-QAM, 64-QAM, 128-QAM, 256-QAM or any other suitable advanced modulation scheme. However the application is not limited in this respect and on-off keying (OOK) may alternatively be used.

In some embodiments, transmitter 212 and receiver 214 may collectively define a coherent transceiver. In such embodiments, the same optical source used to provide CW optical signals to the modulators may be fed to the optical receiver to provide a reference local oscillator (LO). Such optical sources may be disposed on a separate substrate in some embodiments, not shown in FIG. 2A. In some embodiments, transmitter 212 may be configured to transmit a plurality of optical signals having different optical wavelengths, where each optical wavelength may define a wavelength division multiplexing (WDM) channel. Transmitter 212 may transmit optical signals in the O-band, in the S-band, in the C-band, in the L-band, or in any other suitable optical communications band.

Receiver 214 may be configured to receive optical signals of the type described in connection with transmitter 212. Receiver 214 may comprise one or more photodetectors configured to convert the received optical signals to electrical signals. In some embodiments, receiver 214 may further comprise one or more optical hybrids configured to separate a received optical signal into its in-phase and quadrature components.

Transmitter 212 and receiver 214 may be optically coupled to optical loopback circuit 210, which may comprise optical switches 222 and 224. Optical switch 222 may have an input terminal optically coupled to transmitter 212, a first output terminal optically coupled to an output port of optical module 201, and a second output terminal optically coupled to a first input terminal of optical switch 224. In addition to the first input terminal, optical switch 224 may comprise a second input terminal optically coupled to an input port of optical module 201, and an output terminal optically coupled to receiver 214.

In the normal mode, optical switch 222 may route optical signals provided by transmitter 212 to the output port of optical module 201, which may be connected to an optical fiber 230. At the same time, optical switch 224 may route the signal provided through optical fiber 231 to receiver 214. The other end of optical fibers 230 and 231 (not shown in FIG. 2A) may be connected to one or more optical devices, such as another optical module. On the other hand, in the calibration mode, switch 222 may route the optical signal provided by transmitter 212 to switch 224, and switch 224 may route the optical signal to receiver 214. In some embodiments, switches 212 and 214 may be non-ideal. For example, switch 222 may route a fraction of the optical signal to switch 224 in the normal mode, and/or route a fraction of the optical signal to the output port of optical module 201 in the calibration mode. The extinction ratio between the optical signal at the intended terminal of the switch and the optical signal at the unintended terminal may be between 10 dB and 60 dB in some embodiments, though other ranges are also possible.

FIG. 2B illustrates an optical module 251 in which transmitter 262, receiver 264 and optical loopback circuit 260 are disposed on separate substrates. Transmitter 262 and receiver 264 may have the same characteristics as those described in connection with transmitter 212 and receiver 214 of FIG. 2A. Transmitter 262 may be disposed on a substrate 252, and receiver 264 may be disposed on a substrate 254. Substrates 252 and 254 may be silicon substrates in some embodiments. Optical loopback circuit 260 may be connected to transmitter 262 and receiver 264 using optical fibers and/or through free space optics. Optical loopback circuit 260 may comprise optical switches 272 and 274 and may operate in the same manner described in connection with optical loopback circuit 210 of FIG. 2A. The output port of optical module 251 may be connected to optical fiber 280 and the input port of optical module 251 may be connected to optical fiber 281.

Optical switches 222, 224, 272 and 274 may be implemented using any suitable type of optical switches, such as resonant switches, Bragg grating switches, mechanical shutters or Mach Zehnder switches. In some embodiments, optical switches 222, 224, 272 and 274 may be configured to switch only a first polarization, such as transverse electric (TE) polarization, and an additional switch may be used to switch a second polarization, such as transverse magnetic (TM) polarization. In other embodiments, optical switches 222, 224, 272 and 274 may be dual-polarization and may be configured to switch TE and TM polarizations. The switches may have broadband spectral responses to accommodate multiple optical channels. For example, the switches may have an 3 dB-optical bandwidth that is between 0.1 nm and 50 nm.

Figure 3A:
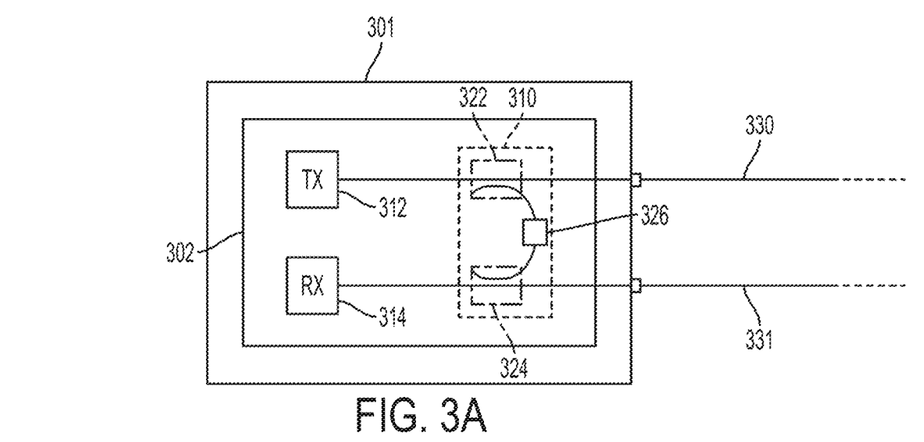
FIGS. 3A-3B are block diagrams illustrating optical feedback circuits comprising optical tap couplers, according to some non-limiting embodiments.
Figure 3B:
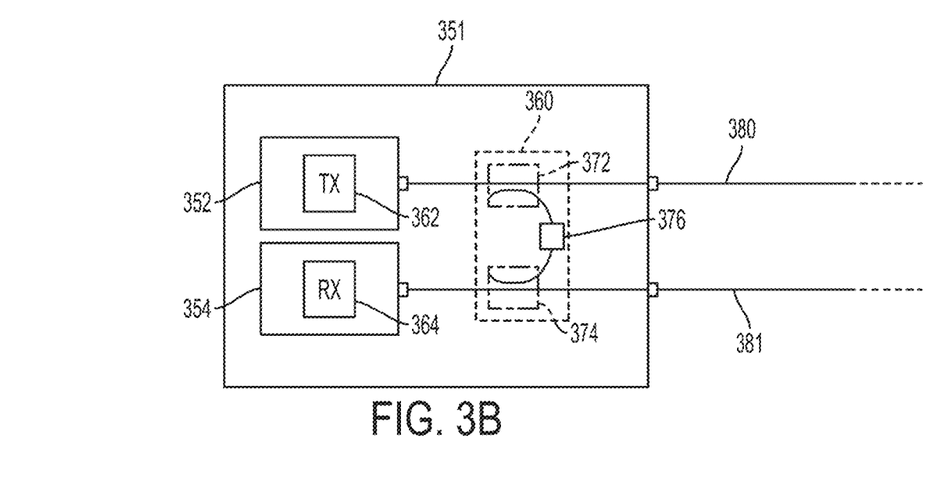

FIGS. 2A-2B illustrate optical loopback circuits using optical switches. However, other configurations are also possible. For example, FIGS. 3A-3B illustrate exemplary optical loopback circuits using tap couplers. FIG. 3A illustrates a case in which transmitter 312, receiver 314 and optical loopback circuit 310 are disposed on a common substrate 302. Transmitter 312 and receiver 314 may have the same characteristics as those described in connection with transmitter 212 and receiver 214 of FIG. 2A. Optical loopback circuit 310 may comprise a first tap coupler 322, a second tap coupler 324, and an optical switch 326 optically coupled between the first and the second tap coupler. The tap couplers may be implemented using directional couplers, while optical switch 326 may be implemented using a variable optical attenuator (VOA). The tap couplers may be configured to tap a fraction of the power of the incoming optical signal, such as less than −40 dB, less than −30 dB, less than −20 dB, less than −10 dB, or less than −6 dB.

In the normal mode, optical switch 326 may provide large attenuation, such as more than 10 dB, more than 20 dB, more than 30 dB, more than 40 dB, or more than 50 dB. In this mode, the output terminal of transmitter 312 may be optically isolated from the input terminal of receiver 314. In the calibration mode, optical switch 326 may provide low attenuation, such as less than 1 dB, less than 3 dB, less than 6 dB, less than 10 dB, or less than 20 dB. In this mode, the output terminal of transmitter 312 may be optically coupled to the input terminal of receiver 314 through tap couplers 322 and 324, and calibration procedures may be initiated. Whether in the normal or calibration mode, transmitter 312 may provide optical signals to the output port of optical module 301, which may be connected to optical fiber 330, and receiver 314 may receive optical signals through optical fiber 331.

FIG. 3B illustrates an optical module 351 in which transmitter 362, receiver 364 and optical loopback circuit 360 are disposed on separate substrates. Transmitter 362 and receiver 364 may have the same characteristics as those described in connection with transmitter 212 and receiver 214 of FIG. 2A. Transmitter 362 may be disposed on a substrate 352, and receiver 364 may be disposed on a substrate 354. Substrates 352 and 354 may be silicon substrates in some embodiments. Optical loopback circuit 360 may be connected to transmitter 362 and receiver 364 using optical fibers and/or through free space optics. Optical loopback circuit 360 may comprise tap couplers 372 and 374, and optical switch 376. Tap couplers 372 and 374 may be implemented using fiber couplers, and optical switch 376 using a VOA. Optical loopback circuit 360 may operate in the same manner described in connection with optical loopback circuit 310 of FIG. 3A. Transmitter 362 may be optically coupled to optical fiber 380 and receiver 364 may be optically coupled to optical fiber 381.

Figure 4A:
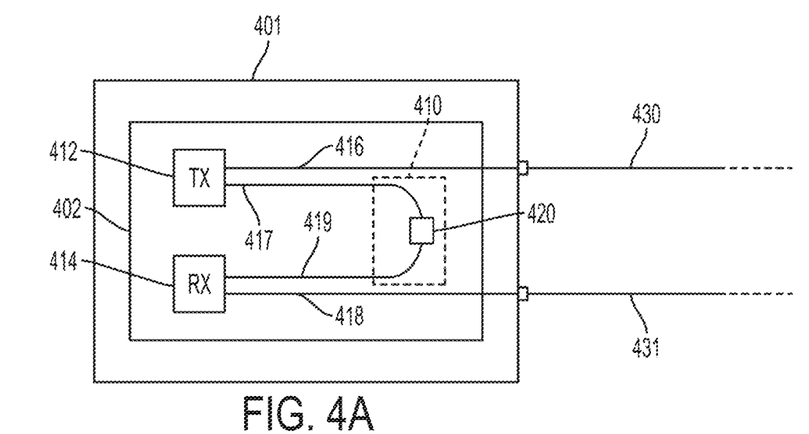
FIGS. 4A-4B are block diagrams illustrating optical feedback circuits coupled between a secondary output terminal of an optical transmitter and a secondary input terminal of an optical receiver, according to some non-limiting embodiments.
Figure 4B:
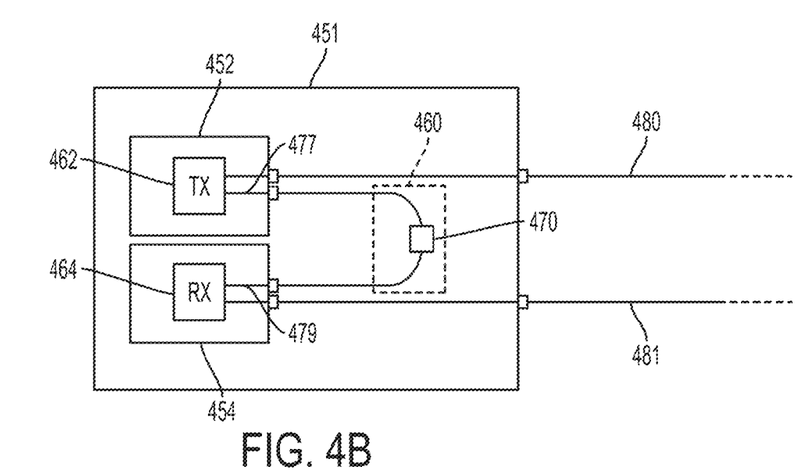
Figure 4C:
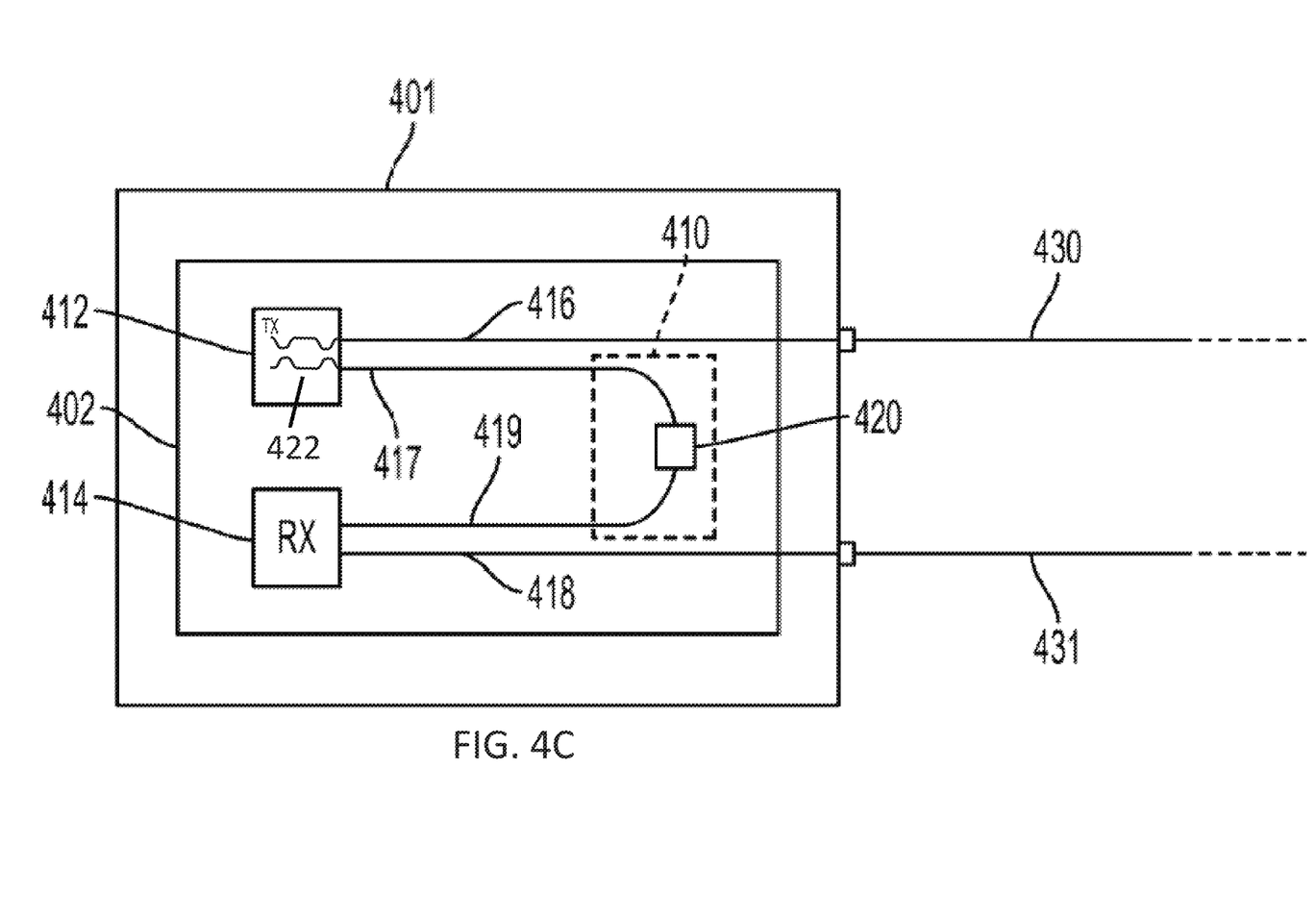
FIG. 4C is a block diagram illustrating an optical feedback circuit coupled to a transmitter comprising a Mach Zehnder modulator, according to some non-limiting embodiments.

In some embodiments, transmitters and receivers may have more than one output/input terminal. In such embodiments, one terminal of the transmitter/receiver, referred to herein as the "primary terminal", may be used to transmit/receive optical signals to/from optical fibers connected to the optical module, and another terminal, referred to herein as the "secondary terminal", may be used for calibration procedures (e.g., a dedicated calibration terminal). Primary and secondary terminals may be formed, for example, using the in-phase and quadrature output terminals of a Mach Zehnder optical modulator. Non-limiting examples of such a configuration are illustrated in FIGS. 4A-4C, according to some embodiments. FIG. 4A illustrates an optical module 401, in which transmitter 412, receiver 414 and optical loopback circuit 410 are disposed on a common semiconductor substrate 402. Transmitter 412 and receiver 414 may have the same characteristics as those described in connection with transmitter 212 and receiver 214 of FIG. 2A. In addition transmitter 412 may have a second output terminal and receiver 414 may have a second input terminal. The primary input terminal 416 of transmitter 412 may be connected to the output port of optical module 401, which may be connected to optical fiber 430. The primary input terminal 418 of receiver 414 may be connected to the input port of optical module 401, which may be connected to optical fiber 431. The secondary output terminal 417 of transmitter 412 may be optically coupled to the secondary input terminal 419 of receiver 414 through optical loopback circuit 420, which may comprise an optical switch 420. Optical switch 420 may be implemented using a VOA. In FIG. 4C, primary and secondary terminals are formed using the in-phase and quadrature output terminals of a Mach Zehnder optical modulator 422.

In the normal mode, optical switch 420 may provide large attenuation, such as more than 10 dB, more than 20 dB, more than 30 dB, more than 40 dB, more than 50 dB, more than 60 dB, between 10 dB and 60 dB, or any value or range of values within such ranges. In this mode, the secondary output terminal of transmitter 412 may be optically isolated from the secondary input terminal of receiver 414. In the calibration mode, optical switch 420 may provide low attenuation, such as less than 1 dB, less than 3 dB, less than 6 dB, less than 10 dB, or less than 20 dB. In this mode, the secondary output terminal of transmitter 412 may be optically coupled to the secondary input terminal of receiver 414, and calibration procedures may be initiated.

FIG. 4B illustrates an optical module 451 in which transmitter 462, receiver 464 and optical loopback circuit 460 are disposed on separate substrates. Transmitter 462 and receiver 464 may have the same characteristics as those described in connection with transmitter 412 and receiver 414 of FIG. 4A. Transmitter 462 may be disposed on a substrate 452, and receiver 464 may be disposed on a substrate 454. Substrates 452 and 454 may be silicon substrates in some embodiments. Optical loopback circuit 460 may be connected to the secondary output terminal 477 of transmitter 462 and the secondary input terminal 479 of receiver 464 using optical fibers and/or through free space optics. Optical loopback circuit 460 may comprise optical switch 470. Optical loopback circuit 460 may operate in the same manner described in connection with optical loopback circuit 410 of FIG. 4A. The primary output terminal of transmitter 462 may be optically coupled to optical fiber 380 and the primary input terminal of receiver 364 may be optically coupled to optical fiber 381.

Figure 5A:
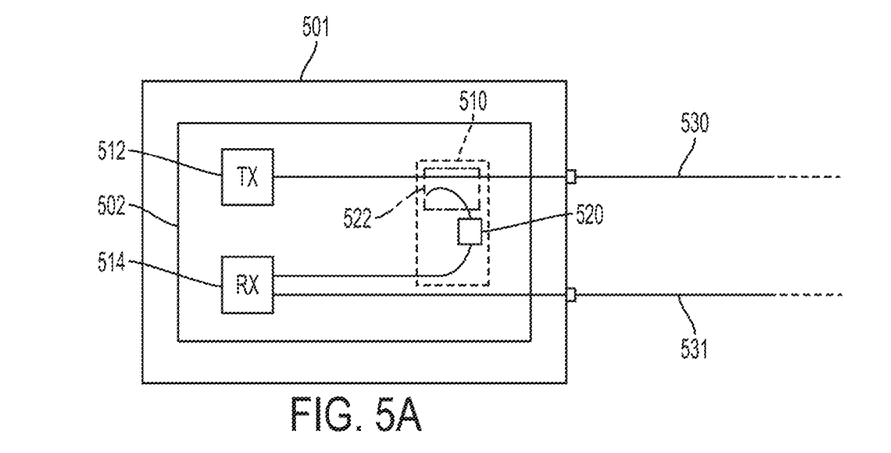
FIGS. 5A-5B are block diagrams illustrating optical feedback circuits coupled between a primary output port of an optical transmitter, using a tap coupler, and a secondary input terminal of an optical receiver, according to some non-limiting embodiments.
Figure 5B:
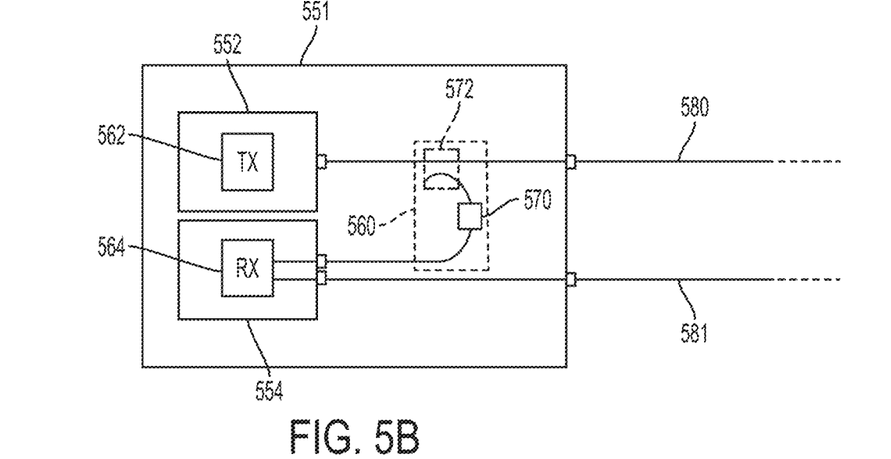

FIGS. 2A, 2B, 3A, 3B, 4A, 4B illustrate various implementations of optical loopback circuits. Any suitable combination of such embodiments may be used. For example, FIGS. 5A-5B illustrate optical modules having a tap coupler on the transmitter side and a receiver having a second input port. The opposite configuration is also possible. FIG. 5A illustrates an optical module 501, in which transmitter 512, receiver 514 and optical loopback circuit 510 are disposed on a common semiconductor substrate 502. Transmitter 512 and receiver 514 may have the same characteristics as those described in connection with transmitter 212 of FIG. 2A and receiver 414 of FIG. 4A. Optical loopback circuit 510 may comprise tap coupler 522 and optical switch 520. Tap coupler 522 may be implemented using a directional coupler and optical switch 520 using a VOA.

In the normal mode, optical switch 520 may provide large attenuation, such as more than 10 dB, more than 20 dB, more than 30 dB, more than 40 dB, more than 50 dB, more than 60 dB, between 10 dB and 60 dB, or any value or range of values within such ranges. In this mode, the output terminal of transmitter 512 may be optically isolated from the secondary input terminal of receiver 514. In the calibration mode, optical switch 520 may provide low attenuation, such as less than 1 dB, less than 3 dB, less than 6 dB, less than 10 dB, or less than 20 dB. In this mode, the output terminal of transmitter 512 may be optically coupled to the secondary input terminal of receiver 514 through tap couplers 522, and calibration procedures may be initiated.

FIG. 5B illustrates an optical module 551 in which transmitter 562, receiver 564 and optical loopback circuit 560 are disposed on separate substrates. Transmitter 562 and receiver 564 may have the same characteristics as those described in connection with transmitter 512 and receiver 514 of FIG. 5A. Transmitter 562 may be disposed on a substrate 552, and receiver 564 may be disposed on a substrate 554. Substrates 552 and 554 may be silicon substrates in some embodiments. Optical loopback circuit 560 may be connected to the output terminal of transmitter 562 and the secondary input terminal of receiver 564 using optical fibers and/or through free space optics. Optical loopback circuit 560 may comprise tap coupler 572 and optical switch 570. Optical loopback circuit 560 may operate in the same manner described in connection with optical loopback circuit 510 of FIG. 5A. The output terminal of transmitter 562 may be optically coupled to optical fiber 580 and the primary input terminal of receiver 564 may be optically coupled to optical fiber 581.

It should be appreciated from the foregoing that aspects of the present application provide various means for looping back an optical signal from the transmitter of an optical transceiver to the receiver of the optical transceiver. In at least some embodiments, such means loop the optical signal from the transmitter to the receiver within the transceiver housing. That is, in at least some embodiments, the looped back signal does not exit (or leave) the transceiver housing). Such means may be used to calibrate the optical transceiver in some embodiments.

Figure 6A:
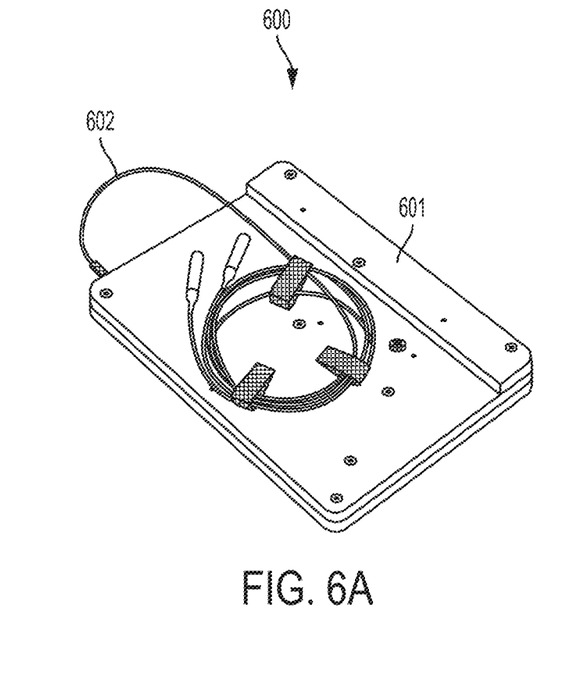
FIG. 6A is an isometric view of an exemplary optical transceiver module, according to some non-limiting embodiments.

Optical modules of the type described herein may be used in telecommunications or in data communications applications. An optical module may be designed based on any suitable standard, such as the C form-factor pluggable transceiver (CFP), CFP2, CFP4, small form-factor pluggable transceiver (SFP) or quad small form-factor pluggable transceiver (QSFP). An optical module may comprise a housing which may host one or more optical transceivers, including optical loopback circuits of the types described herein. In some embodiments, the housing may comprise a metallic structure enclosing, and configured to electromagnetically isolate, the optical transceiver. An exemplary optical module, according to some non-limiting embodiments, is illustrated in FIG. 6A. Optical module 600 may comprise housing 601. Optical module 600 may serve as optical module 201, 251, 301, 351, 401, 451, 501 or 551, which may be disposed within housing 601. In some embodiments, optical module 600 may comprise one or more lasers configured to provide continuous wave (CW) optical signals to the transmitter, and, in the case of coherent transceivers, to the receiver. In some embodiments, optical module 600 may comprise a thermoelectric cooler (TEC), configured to stabilize the temperature of the laser(s). Optical module 600 may comprise a digital transceiver or an analog transceiver. According to the former, the optical module may comprise circuitry configured to digitize the signals received by the receiver. Such circuitry may comprise an application-specific integrated circuit (ASIC), a field programmable gate array (FPGA) or any other suitable type of digital circuit. According to the latter, the optical module may be configured to provide signals in the analog domain. Such signals may be digitized with circuitry disposed outside housing 601. Optical fiber bundle 602 may be connected to optical module 600, and may serve as optical fiber 230, 231, 280, 281, 330, 331, 380, 381, 430, 431, 480, 481, 530, 531, 580, 581, or any suitable combination thereof.

Figure 6B:
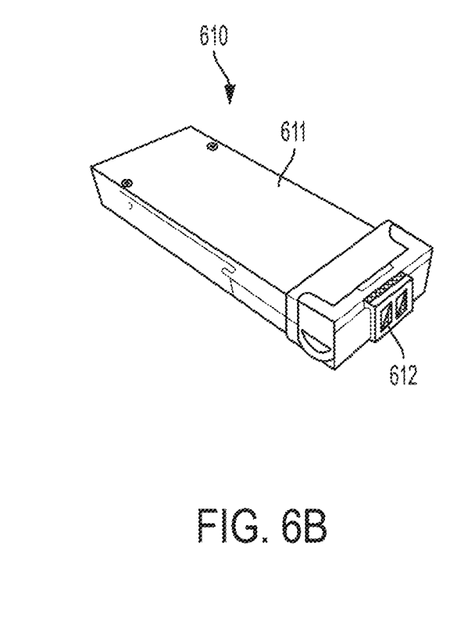
FIG. 6B is an isometric view of an exemplary pluggable optical transceiver module, according to some non-limiting embodiments.

In some embodiments, the optical module may be pluggable. Pluggable optical modules of the type described herein may be configured to be mated with receptacles mounted on printed circuit boards (PCB). An exemplary pluggable optical module is illustrated in FIG. 6B. Optical module 610 may comprise housing 611. Optical module 610 may serve as optical module 201, 251, 301, 351, 401, 451, 501 or 551, which may be disposed within housing 611, and may comprise the components described in connection with optical module 600. In some embodiments, optical module 610 may comprise one or more optical ports 612, each optical port being configured to receive an optical fiber therein.

Figure 7:
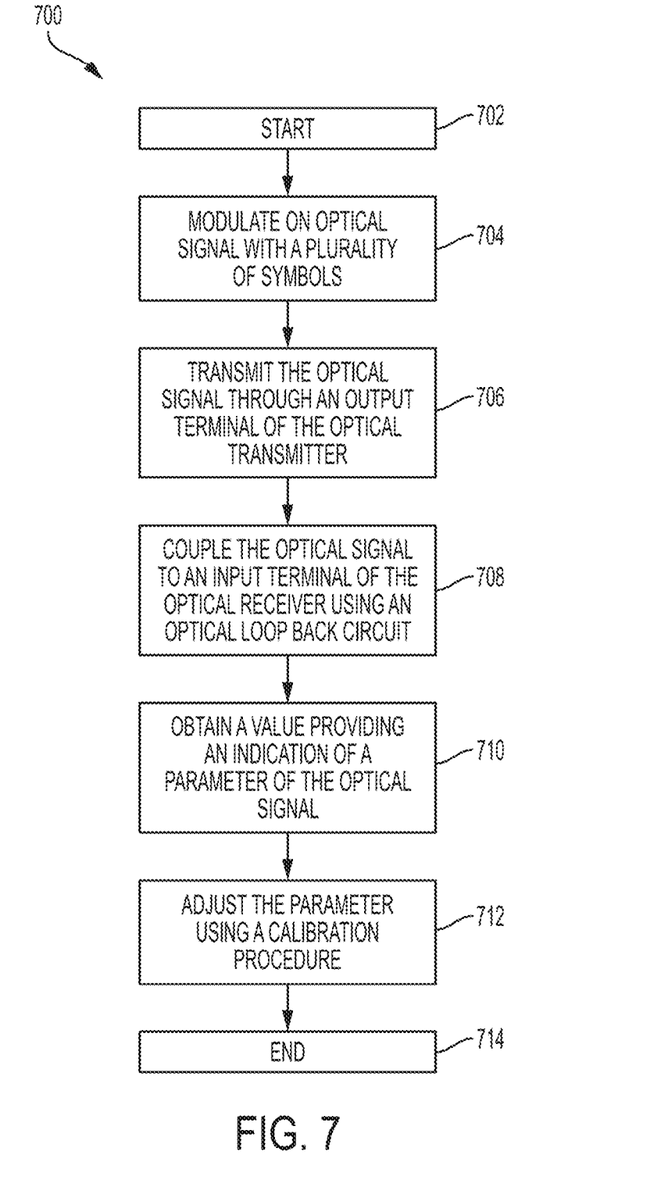
FIG. 7 is a flowchart illustrating a method for providing an optical signal generated by an optical transmitter to a corresponding optical receiver, according to some non-limiting embodiments.

According to one aspect of the present application, a method for calibrating an optical transceiver using an optical loopback circuit of the type described herein is provided. Method 700 may begin at act 702. At act 704, an optical signal may be modulated using a transmitter disposed within the housing of an optical module. In some embodiments, the optical signal may be modulated with a plurality of symbols, such that at least one of the plurality of such symbols may represent a number of bits greater than one, according to an advanced modulation scheme.

At act 706, the modulated optical signal may be transmitted through an output terminal of the optical transmitter, whether through a primary or a secondary output terminal.

At act 708, at least a portion of the modulated optical signal may be coupled to an input terminal of an optical receiver, whether to a primary or a secondary input terminal, using an optical loopback circuit of any of the types described herein. Thus, the coupled signal may remain within the transceiver housing when passing from the transmitter of the transceiver to the receiver of the transceiver, in at least some embodiments. The optical loopback circuit may comprise optical switches and/or tap couplers, as discussed in connection with FIGS. 2A, 2B, 3A, 3B, 4A, 4B, 5A and 5B.

At act 710, a value providing an indication of a parameter associated with the modulated optical signal may be obtained. The parameter may indicate an output optical power, an extinction ratio, or any other suitable characteristic associated with the modulated optical signal. In some embodiments, the optical receiver may provide an analog electrical signal representing the modulated optical signal to electronic circuitry, such as an ASIC or an FPGA. The electronic circuitry may be disposed within or outside the housing of the optical module.

At act 712, using a calibration procedure, the electronic circuitry may provide one or more control signals to the optical transmitters to adjust the parameter to a desired value. For example, if the output optical power associated with the modulated optical signal is less that a desired value, the control signal(s) may be configured to increase the optical power provided by the transmitter. As another example, if the extinction ratio associated with the modulated optical signal is less that a desired value, the control signal(s) may be configured to increase the extinction ratio provided by the transmitter. Method 700 may end at act 714.

It should be appreciated that the method 700 does not involve the use of fiber jumpers. Thus, the method may be employed repeatedly during the lifetime of a transceiver without having to reconfigure external fiber communication channels of the transceiver.

Aspects of the present application may provide one or more benefits, some of which have been previously described. Now described are some non-limiting examples of such benefits. It should be appreciated that not all aspects and embodiments necessarily provide all of the benefits now described. Further, it should be appreciated that aspects of the present application may provide additional benefits to those now described.

Aspects of the present application provide optical transceivers having an optical loopback circuit used for calibration of the optical transceiver. Being the optical loopback circuit disposed within the housing of the optical transceiver, calibration of the optical transceiver may be performed with the same fiber connections used during the normal mode. For example, the calibration may be performed even if the ports of an optical transceiver are connected to another optical device in a network, such as a switch, a router or another optical transceiver. In some circumstances, using the same fiber connections may simplify the operations associated with switching the optical transceiver between the normal mode and the calibration mode.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. An apparatus, comprising:
a housing; and
an optical transceiver disposed within the housing, the optical transceiver comprising:
an optical transmitter having output terminals, the optical transmitter being configured to transmit a plurality of symbols through the output terminals, wherein at least one symbol of the plurality of symbols represents a number of bits greater than one;
an optical receiver having an input terminal;
a first optical waveguide and a second optical waveguide; and
an optical loopback circuit coupling a first output terminal of the output terminals of the optical transmitter to the input terminal of the optical receiver, wherein the optical loopback circuit comprises an optical switch,
wherein the first output terminal and a second output terminal of the output terminals are formed using respective output terminals of a Mach-Zehnder optical modulator configured to modulate the plurality of symbols onto an optical signal, and
wherein the first optical waveguide couples the first output terminal of the optical transmitter to the optical switch, and wherein the second optical waveguide couples the second output terminal of the optical transmitter to a fiber output port of the apparatus.

2. The apparatus of claim 1, wherein the optical transmitter, the optical receiver and the optical loopback circuit are disposed on a common semiconductor substrate.

3. The apparatus of claim 1, wherein the optical transmitter and optical receiver are disposed on separate substrates.

4. The apparatus of claim 1, wherein the optical loopback circuit comprises free space optics.

5. The apparatus of claim 1, wherein the optical loopback circuit comprises at least one optical fiber.

6. The apparatus of claim 1, wherein the input terminal is a first input terminal and wherein the optical receiver comprises a second input terminal connected to an optical fiber.

7. The apparatus of claim 1, further comprising an optical source, wherein:
the optical transceiver comprises a coherent optical transceiver, and
the optical source is configured to provide light to both the optical transmitter and the optical receiver.

8. A method comprising:
modulating, with a Mach-Zehnder optical modulator having first and second output terminals and disposed within a housing, a plurality of symbols onto an optical signal, wherein at least one symbol of the plurality of symbols represents a number of bits greater than one;
transmitting a first portion of the optical signal outside the housing through the first output terminal of the Mach-Zehnder optical modulator, wherein transmitting the first portion of the optical signal outside the housing comprises transmitting the first portion of the optical signal through a first optical waveguide coupling the first output terminal of the Mach-Zehnder optical modulator to a fiber output port; and
coupling a second portion of the optical signal from the second output terminal of the Mach-Zehnder optical modulator to an input terminal of an optical receiver disposed within the housing using an optical loopback circuit disposed within the housing, wherein coupling the second portion of the optical signal from the second output terminal of the Mach-Zehnder optical modulator to the input terminal of the optical receiver comprises transmitting the second portion of the optical signal through a second optical waveguide coupling the second output terminal of the Mach-Zehnder optical modulator to an optical switch of the optical loopback circuit.

9. The method of claim 8, further comprising, in response to the coupling of the second portion of the optical signal, obtaining, using circuitry coupled to the optical receiver, a value providing an indication of a parameter associated with the optical transmitter.

10. The method of claim 9, wherein the parameter comprises an output optical power.

11. The method of claim 9, wherein the parameter comprises an extinction ratio associated with the optical signal.

12. The method of claim 9, further comprising adjusting the parameter, based on the value, using a calibration procedure.

13. The method of claim 8, wherein coupling the second portion of the optical signal to an input terminal of an optical receiver comprises coupling the optical signal using a grating switch.

14. The method of claim 8, wherein coupling the second portion of the optical signal to an input terminal of an optical receiver comprises coupling the optical signal using an optical fiber.

15. An apparatus, comprising:
a housing; and
an optical transceiver disposed within the housing, the optical transceiver comprising:
an optical transmitter having a first output terminal and a second output terminal, the optical transmitter being configured to transmit a plurality of symbols through the first output terminal, wherein at least one symbol of the plurality of symbols represents a number of bits greater than one;
an optical receiver having a first input terminal and a second input terminal, the first input terminal of the optical receiver being connected to an optical fiber;
a first optical waveguide and a second optical waveguide; and
an optical loopback circuit coupling the second output terminal of the optical transmitter to the second input terminal of the optical receiver, wherein the optical loopback circuit comprises an optical switch,
wherein the optical transmitter and optical receiver are disposed on separate substrates,
wherein the first output terminal and the second output terminal of the optical transmitter are formed using respective output terminals of a Mach-Zehnder optical modulator configured to modulate the plurality of symbols onto an optical signal, and
wherein the first optical waveguide couples the first output terminal of the optical transmitter to a fiber output port of the apparatus and wherein the second optical waveguide couples the second output terminal of the optical transmitter to the optical switch.

\* \* \* \* \*